(12) United States Patent
Gamble

(10) Patent No.: US 11,974,593 B2
(45) Date of Patent: May 7, 2024

(54) SYSTEM FOR PROCESSING FOODSTUFF

(71) Applicant: Polar Systems Limited, King's Lynn (GB)

(72) Inventor: Peter John Gamble, King's Lynn (GB)

(73) Assignee: Polar Systems Limited, King's Lynn (GB)

( * ) Notice: Subject to any disclaimer, the term of this patent is extended or adjusted under 35 U.S.C. 154(b) by 0 days.

(21) Appl. No.: 17/276,425

(22) PCT Filed: Sep. 17, 2019

(86) PCT No.: PCT/GB2019/052619
§ 371 (c)(1),
(2) Date: Mar. 15, 2021

(87) PCT Pub. No.: WO2020/058703
PCT Pub. Date: Mar. 26, 2020

(65) Prior Publication Data
US 2022/0030925 A1    Feb. 3, 2022

(30) Foreign Application Priority Data
Sep. 19, 2018 (GB) .................................. 1815282

(51) Int. Cl.
*A23P 20/13* (2016.01)
*A23G 3/26* (2006.01)
(Continued)

(52) U.S. Cl.
CPC ............ *A23P 20/13* (2016.08); *A23G 3/0095* (2013.01); *A23G 3/26* (2013.01); *A23P 20/18* (2016.08)

(58) Field of Classification Search
CPC ... B05C 3/05; B05C 3/08; A23P 20/13; A23P 20/18; A23P 20/10; A23G 3/2076;
(Continued)

(56) References Cited

U.S. PATENT DOCUMENTS

| | | | | |
|---|---|---|---|---|
| 1,552,293 A | * | 9/1925 | Gardner | ............... A23G 3/0215 118/19 |
| 2,576,952 A | * | 12/1951 | Lowe | .................. B05B 13/0221 118/304 |

(Continued)

FOREIGN PATENT DOCUMENTS

| | | |
|---|---|---|
| CN | 2925123 Y | 7/2007 |
| CN | 202819579 U | 3/2013 |
| WO | 2017/018971 A1 | 2/2017 |

OTHER PUBLICATIONS

GB2373988, Arensman, "Rotary Drum System for batter coating french fried potato strips", published Oct. 9, 2002 (Year: 2002).*

(Continued)

*Primary Examiner* — Jethro M. Pence
(74) *Attorney, Agent, or Firm* — Workman Nydegger

(57) ABSTRACT

A system for processing foodstuff includes a drum and a conveyor for conveying foodstuff to the drum; the drum having a peripheral wall and at least one opening into which, in use, foodstuff enters the drum; the drum having a proximal extremity and a distal extremity; the drum being rotatable about at least one axis of rotation; whereby foodstuff may be tumbled for flavouring and/or seasoning the foodstuff; and the drum being removable; wherein the peripheral wall includes titanium or a titanium alloy.

19 Claims, 2 Drawing Sheets

(51) Int. Cl.
*A23G 3/34* (2006.01)
*A23P 20/18* (2016.01)

(58) Field of Classification Search
CPC .. A23G 3/0095; A23G 3/26; B01J 2/12; B01J 2/14; B01F 33/051; B01F 33/052
USPC ........... 118/19, 22, 620, 621, 629, 417, 418; 99/494
See application file for complete search history.

(56) References Cited

U.S. PATENT DOCUMENTS

| | | | | |
|---|---|---|---|---|
| 2,897,776 A * | 8/1959 | Black | A47J 37/047 | 99/421 H |
| 3,088,711 A * | 5/1963 | Phillips | A23N 17/007 | 366/187 |
| 3,101,040 A * | 8/1963 | Lanz | A23P 10/20 | 34/142 |
| 3,408,980 A * | 11/1968 | Benson | A23P 20/13 | 118/19 |
| 3,536,035 A * | 10/1970 | Watkins | A23L 7/122 | 118/19 |
| 3,567,070 A * | 3/1971 | Gordon | A23P 20/13 | 221/86 |
| 3,595,680 A * | 7/1971 | Fischer et al. | A23B 4/10 | 118/30 |
| 3,608,516 A * | 9/1971 | Temple | A21C 9/04 | 118/19 |
| 3,611,984 A * | 10/1971 | Angold | A23P 20/13 | 118/19 |
| 3,614,924 A * | 10/1971 | Hickey | A47J 37/1214 | 198/723 |
| 3,648,648 A | 3/1972 | Johnson et al. | | |
| 3,767,537 A * | 10/1973 | Selker | C25D 1/04 | 204/216 |
| 3,868,048 A * | 2/1975 | Soodalter | A23P 20/15 | 417/457 |
| 3,890,923 A * | 6/1975 | Dumoulin | A23G 3/26 | 118/19 |
| 3,955,529 A * | 5/1976 | Reed | A21C 9/04 | 118/30 |
| 4,458,586 A * | 7/1984 | Reed | A23B 4/12 | 118/19 |
| 4,543,907 A * | 10/1985 | Fowler | B05C 19/00 | 118/19 |
| 4,576,108 A * | 3/1986 | Socola | A23P 20/15 | 118/19 |
| 4,640,218 A * | 2/1987 | Motoyama | A23G 3/26 | 118/19 |
| 4,755,390 A * | 7/1988 | Calandro | A23L 7/122 | 426/620 |
| 4,976,978 A * | 12/1990 | Schubert | A23G 9/245 | 426/295 |
| 5,002,205 A * | 3/1991 | Itoh | A23G 3/26 | 222/459 |
| 5,050,528 A * | 9/1991 | Yamada | A23G 3/26 | 366/175.3 |
| 5,090,593 A * | 2/1992 | Ejike | A23P 20/13 | 118/19 |
| 5,133,278 A * | 7/1992 | Anderes | A23G 3/2076 | 118/19 |
| 5,226,354 A * | 7/1993 | Stewart | A23G 3/26 | 118/19 |
| 5,265,525 A * | 11/1993 | Stewart | A23P 20/13 | 118/19 |
| 5,353,994 A * | 10/1994 | Clark | A23P 20/13 | 239/689 |
| 5,433,964 A * | 7/1995 | Norman | B65B 25/001 | 426/303 |
| 5,645,878 A * | 7/1997 | Breslin | A23L 27/72 | 426/103 |
| 5,664,489 A * | 9/1997 | Herrick, IV | A23P 20/13 | 118/19 |
| 5,755,880 A * | 5/1998 | Norman | A21C 9/04 | 118/19 |
| 5,846,324 A * | 12/1998 | Marshall | A23B 7/159 | 118/19 |
| 5,855,165 A * | 1/1999 | Herrick, IV | A23P 20/13 | 118/19 |
| 5,876,775 A * | 3/1999 | Behnke | A23P 20/13 | 426/103 |
| 5,927,186 A * | 7/1999 | Herrick, IV | A23P 20/13 | 118/19 |
| 5,937,744 A * | 8/1999 | Nothum, Sr. | A23L 13/03 | 118/18 |
| 6,000,320 A * | 12/1999 | Herrick, IV | A23P 20/13 | 118/19 |
| 6,113,960 A * | 9/2000 | Tashiro | A21C 9/04 | 118/30 |
| 6,158,332 A * | 12/2000 | Nothum, Sr. | A23G 3/26 | 118/18 |
| 6,235,330 B1 * | 5/2001 | Scherpf | A23P 20/18 | 426/89 |
| 6,840,664 B2 * | 1/2005 | Burke | A23P 20/15 | 366/240 |
| 6,997,134 B2 * | 2/2006 | Bayus | A23G 3/0089 | 118/19 |
| 7,055,455 B2 * | 6/2006 | Burke | A23P 20/12 | 118/308 |
| 7,153,533 B2 * | 12/2006 | Burke | A23P 20/18 | 426/295 |
| RE39,631 E * | 5/2007 | Scherpf | A23P 20/18 | 426/89 |
| 7,252,048 B2 * | 8/2007 | Nohynek | B01J 2/12 | 118/19 |
| 7,418,920 B2 * | 9/2008 | Kuenen | A21C 9/04 | 118/30 |
| 7,827,929 B2 * | 11/2010 | Garrison | B05B 7/10 | 118/313 |
| 7,906,163 B2 * | 3/2011 | Dargusch | A23P 20/12 | 118/24 |
| 8,001,920 B2 * | 8/2011 | King | A23L 13/57 | 118/19 |
| 8,007,848 B2 * | 8/2011 | Garrison | B05B 7/1486 | 239/487 |
| 8,096,259 B1 * | 1/2012 | Nothum, Jr. | A23P 20/12 | 118/308 |
| 8,142,828 B2 * | 3/2012 | Brady, Sr. | A23P 20/13 | 118/19 |
| 8,181,592 B2 * | 5/2012 | Karpinsky | A21C 15/002 | 118/57 |
| 8,359,995 B2 * | 1/2013 | Bakos | A21C 15/002 | 118/57 |
| 8,460,731 B2 * | 6/2013 | Mazin | A23P 20/15 | 426/456 |
| 8,960,119 B1 * | 2/2015 | Nothum, Jr. | A23P 20/12 | 118/308 |
| 9,370,197 B1 * | 6/2016 | Karpinsky | A23G 3/26 | |
| 9,609,891 B2 * | 4/2017 | Petri | A23P 20/12 | |
| 9,687,018 B1 * | 6/2017 | Nothum, Jr. | A23P 20/12 | |
| 10,093,483 B2 * | 10/2018 | Ramezani | B65G 13/07 | |
| 10,267,379 B2 * | 4/2019 | Ambrose | F16F 15/28 | |
| 10,363,532 B2 * | 7/2019 | Cornelius | A23G 1/0036 | |
| 10,669,099 B2 * | 6/2020 | Ramezani | B65G 13/07 | |
| 10,966,450 B2 * | 4/2021 | Tubic | A23P 20/12 | |
| 11,076,628 B2 * | 8/2021 | Reeser | A23P 20/13 | |
| 11,134,712 B2 * | 10/2021 | Nelson | A23G 3/26 | |
| 11,412,772 B2 * | 8/2022 | Nothum, Jr. | A23P 20/13 | |
| 11,465,169 B1 * | 10/2022 | Rosenthal | B05C 19/008 | |
| 2002/0022072 A1* | 2/2002 | Burke | A23P 20/15 | 118/19 |
| 2003/0085234 A1* | 5/2003 | Paumen | B01F 29/63 | 99/535 |
| 2004/0149147 A1 | 8/2004 | Bayus et al. | | |
| 2007/0227369 A1* | 10/2007 | Paumen | B01F 29/63 | 99/644 |
| 2008/0032013 A1* | 2/2008 | Paumen | A23P 20/13 | 426/389 |

(56) References Cited

U.S. PATENT DOCUMENTS

| | | | |
|---|---|---|---|
| 2011/0114019 A1* | 5/2011 | Zhu | B05B 5/081 |
| | | | 118/623 |
| 2012/0237638 A1* | 9/2012 | Mazin | A23P 20/18 |
| | | | 426/456 |
| 2014/0154379 A1* | 6/2014 | Mazin | A23P 20/18 |
| | | | 426/465 |
| 2015/0237891 A1* | 8/2015 | Petri | B01J 2/006 |
| | | | 118/19 |
| 2018/0055085 A1 | 3/2018 | Reeser et al. | |
| 2019/0059437 A1* | 2/2019 | Svejkovsky | A23G 3/26 |
| 2021/0386109 A1* | 12/2021 | Nelson | A23P 20/13 |

OTHER PUBLICATIONS

International Search Report dated Nov. 26, 2019, issued in PCT Application No. PCT/GB2019/052619, filed Sep. 17, 2019.
Written Opinion dated Nov. 26, 2019, issued in PCT Application No. PCT/GB2019/052619, filed Sep. 17, 2019.

* cited by examiner

SYSTEM FOR PROCESSING FOODSTUFF

FIELD OF THE INVENTION

The invention relates to systems for processing foodstuff. In certain embodiments, the invention concerns on machine seasoning and/or flavouring systems.

The term foodstuff is to be interpreted broadly and may include at least the following: seafood, meats, fruits, vegetables, expanded snack foods, confectionary, frozen products, fried, and baked foodstuff etc. In addition, it may also include particles of foodstuff or flakes. Furthermore, it may also include additions such as oil, glaze, slurries, spices, flavourings, seasonings, and butters etc. These lists are not intended to be exhaustive.

BACKGROUND TO THE INVENTION

On machine seasoning systems are well known. These are generally systems which incorporate a drum for receiving foodstuff in various forms for mixing. Typical systems employ a polymeric drum which requires regular replacement. The surface of the peripheral walls of regular polymeric drums tend to abrade and reveal crevices in which food products may accumulate and become eventually difficult, if not impossible, to remove during a cleaning process. There are further inherent drawbacks of these prior art polymeric drums as they tend to be incapable of efficient switching between electrostatic operation and non-electrostatic operation. The temperature of the foodstuff introduced to the drum must also be carefully monitored as it would otherwise potentially melt the peripheral wall itself.

Consequently, several of the embodiments of the invention overcome several drawbacks in these conventional on machine seasoning systems. In particular, certain embodiments of the invention improve the structure of the drum itself. Furthermore, improvements with regards to the ease of which a drum is removed and replaced are provided. A particular aspect of improvement concerns the ability of the drum to be removed by a single operator whilst being sufficiently robust to withstand accidental dropping from a height by a typical operator. In addition, the positioning of the drum is also improved in certain embodiments. Further improvements and advantages will become apparent in the following sections.

SUMMARY OF THE INVENTION

In its broadest independent aspect, the invention provides a system for processing foodstuff comprising a drum and a conveyor for conveying foodstuff to the drum; the drum having a peripheral wall and at least one opening into which, in use, foodstuff enters the drum; the drum having a proximal extremity and a distal extremity; the drum being rotatable about at least one axis of rotation; whereby foodstuff may be tumbled for flavouring and/or seasoning the foodstuff; and the drum being removable; wherein the peripheral wall comprises titanium or a titanium alloy. This configuration is particularly advantageous to significantly reduce the weight of the drum allowing its removal whilst at the same time allowing the drum to resist deformation when, for example, dropped during routine cleaning or maintenance. It may also be particularly advantageous as it withstands high temperature cleaning.

In a subsidiary aspect, the peripheral wall comprises longitudinally disposed fold lines forming longitudinally extending facets. This configuration provides improved resistance to bending particularly when the drum is fully loaded with relatively large quantities of foodstuff and liquids. In an embodiment with the provision of a succession of longitudinal facets, the drum presents a relief for optimal mixing of the food product.

In a subsidiary aspect, the peripheral wall forms either part triangular or part trapezoidal repeating patterns when the peripheral wall is viewed in cross-section. In certain embodiments, the repeating patterns present advantageous peaks and troughs for not only mixing the foodstuff with produce but also allowing advantageous cleaning of the drum. These combinations are also particularly advantageous in terms of the ease with which they can be formed by folding despite the relative toughness of the titanium contained in the peripheral wall itself.

In a subsidiary aspect, the drum is mounted at its proximal extremity on a mount which substantially surrounds the perimeter of the drum; the mount being releasable to allow the removal of the drum. By mounting the drum at one of its extremities an advantageous lever arm is achieved to improve the pan and tilting when in certain embodiments such functionality is incorporated in the system.

In a subsidiary aspect, the mount houses a belt arranged to drive the rotation of the drum about the drum's longitudinal central axis. This configuration is particularly advantageous because it allows the drum to be relatively rapidly slipped in and slipped out of engagement with the driving belt which minimises further the potential down time typically experienced during removal and replacement of a drum.

In a further subsidiary aspect, the drum incorporates a ring disposed at its proximal extremity and the belt releasably engages the proximal ring to convey rotation. This configuration provides a particularly advantageous engagement to facilitate the removal and replacement of a drum during cleaning events.

In a further subsidiary aspect, the drum is mounted to allow it to pivot; whereby its distal extremity is displaceable in one or a combination of the X and Y directions. This configuration improves the configurability of the drum for various potential positions in a particular food processing system and may also provide the basis for adaptation during different stages of the food processing.

In a further subsidiary aspect, the distal extremity of the drum comprises a ring in certain embodiments and this allows the drum to be symmetrical and may therefore allow the drum to be attached at either end to an appropriate mount or varying surface.

In a further subsidiary aspect, the peripheral wall has a thickness of less than 1.75 mm. This configuration is particularly advantageous in order to allow the drum to retain its aspect ratio during use whilst at the same time allowing significant reduction in the potential weight of a drum to allow operators to readily single-handedly remove, clean and return a drum to its processing station. In a further subsidiary aspect, the peripheral wall has a thickness of 1.25 to 1.75 mm. At these levels, the drum withstands considerable stresses and strains for extensive cycles of use.

In a further subsidiary aspect, the peripheral wall has a thickness of about 1.5 mm. This configuration is particularly advantageous to minimise deformation of impact whilst at the same time facilitating single-operator removal and replacement.

In a further subsidiary aspect, the drum has at its proximal and/or distal extremities a thickened lip which constitutes a rim about their perimeters. In cross-section the lip may be 5 mm thick and 10 mm wide. The thickness may therefore be in total for these extremities 5 mm for the lip and 1.2 mm for the wall itself.

In a further subsidiary aspect, the peripheral wall has a surface finish of 0.5 to 1 micron. This configuration provides a sufficiently smooth surface for relatively straightforward cleaning of the surface. In a preferred embodiment, the peripheral wall has a surface finish of 0.8 micron or less.

In a subsidiary aspect, the system further comprises a mixing stage incorporating one or more nozzles for introducing liquid into the drum; whereby liquid is applied to foodstuff. This configuration is particularly advantageous in order to apply liquid to facilitate adhesion of particles and/or flakes to foodstuff in further processing stages.

In a further subsidiary aspect, the system further comprises a mixing stage incorporating a feeder for introducing further foodstuffs such as powder, flakes and/or spices. This provides a sequential and improved adhesion and mixing of foodstuff and its selected flavouring.

In a further subsidiary aspect, the system further comprises electrostatic charging means for polarising foodstuff. This further improves the adhesion of charge particles to foodstuff as these are appropriately charged.

In a further subsidiary aspect, the system incorporates a conductive wheel which may be configured to engage the drum. This allows the on machine seasoning system to be adapted selectively for either electrostatic flavouring or non-electrostatic flavouring dependent upon the desired function of the system.

DETAILED DESCRIPTION OF THE FIGURES

Figure 1:
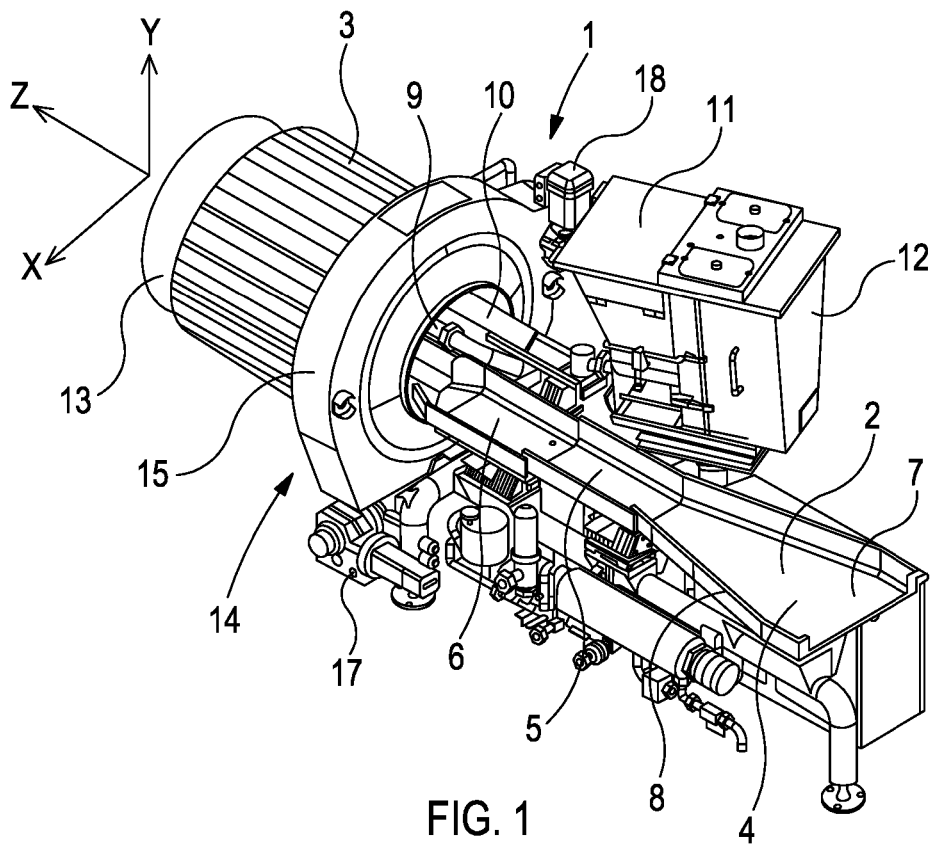
FIG. 1 shows a perspective view of an embodiment of the invention.
Figure 2:
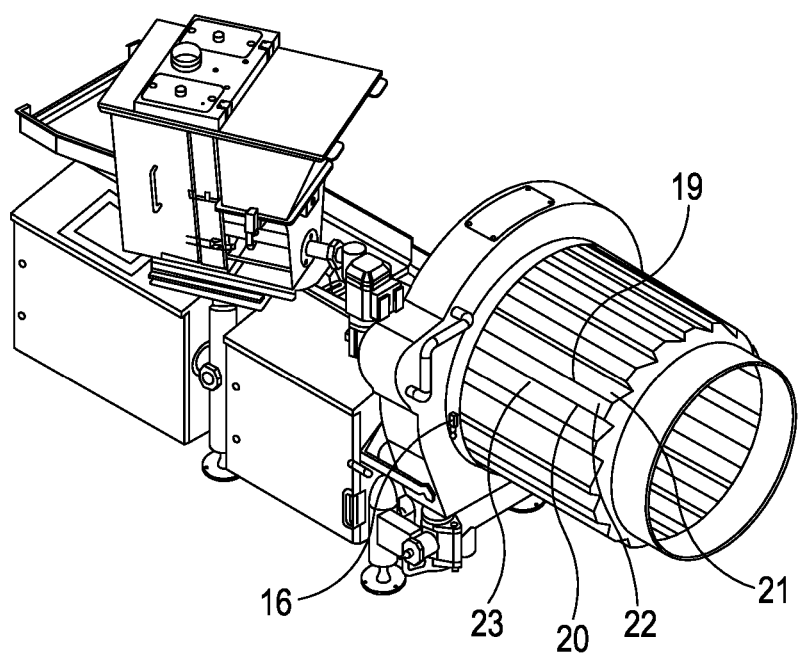
FIG. 2 shows a further perspective view of the embodiment of the invention.
Figure 3:
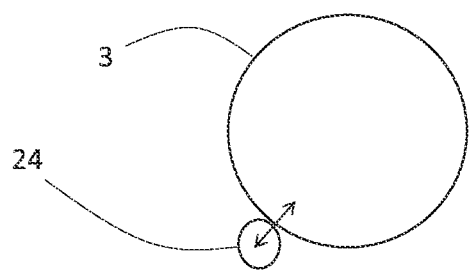
FIG. 3 shows a drum in a schematic cross-sectional view showing the selective engagement of a conductor and the drum.

FIG. 1 shows an on machine seasoning system generally referenced 1 comprising a conveyor generally referenced 2 for conveying foodstuff gradually into the drum 3. Conveyor 2 comprises vibratory panels 4, 5 and 6. Panel 4 has a relatively wide initial portion 7 followed by a tapered portion 8 for funnelling the foodstuff onto panel 5. The panels are equipped with appropriate actuators which may be secured underneath and which may vibrate the panels in order to cause the foodstuff to jump forward or be gradually conveyed towards the drum 3. Once funnelled, the foodstuff is weighed as it is carried by panel 5. The surface finish of the weighing panel may be approximately 0.05 micron which allows the product to be continuously weighed within a very high level of accuracy such as within a one gram accuracy. The drum in feed panel 6 may be arranged to provide rapid release of foodstuff and may be disposed to form an off-centre feed and to control product flow in line with the drum rotation. This may be particularly advantageous in order to reduce wastage.

Once in drum 3 the foodstuff may undergo a succession of multiple processing stages. In the first stage, liquids such as oil may be sprayed onto the foodstuff by nozzle 9. Once the foodstuff has been sufficiently imbued by the oil, powder and other such particulate material may be fed during a second stage. In order to reach deeper within the drum a scarf vibrator 10 carries accurately the quantum of powder required into the second stage within the drum. A hopper 11 contains a store of powder produce which may be fed by a worm or other feeding contraption onto the scarf vibrator 10. An aerator may also be provided for improved dispersion of the powder. A server motor to power the aerator may be provided in an adjacent compartment 12. In this embodiment, once the foodstuff has been imbued in the liquid and then appropriately coated with sufficient powder a final portion of the drum is reserved for additional mixing without being provided with feeding equipment—this further ensures mixing of the foodstuff for improved homogeneity.

The drum itself is disposed for rotation around its central axis. The drum has at its distal extremity a ring 13 with a smooth circular perimeter on both the outer and inner surfaces. At its proximal extremity 14, the drum similarly incorporates a ring for engagement with a mount 15. Fasteners such as fastener 16 may be provided to release the drum from mount 15. Once released, an operator may readily carry the drum to a cleaning station and then return it for further processing. When the drum is secured to mount 15, it may be pivoted in one or both of the X and Y directions. This would allow for example for the displacement and engagement with different processing stations. It may also allow for improved cleaning during or after operation without necessarily removing the drum. The displacement in the Y direction may be achieved by an up and down motor 17 whereas the left and right displacement may also be achieved by appropriate motor configurations or manually dependent upon the embodiment in question. The rotation or tumbling of the drum may be achieved by a motor 18 for step wise rotation in 0.1 degree increments. The drum may be held with a stainless steel mount or annulus and can be tipped along with the wet additions system. In 0.1 degree increments dependent upon the requirements of a pre-set recipe. It may also be configured to increase or decrease residence time to improve product coating and consistency. Calibration, drum removal and cleaning of the drum may be facilitated by a rotation in the upwards direction by up to 120°.

The peripheral wall of drum 3 may incorporate a number of fold lines such as fold lines 19 and 20. By virtue of the configuration of these fold lines a succession of longitudinal facets such as facets 21, 22 and 23 are provided. Should these facets be viewed in cross-section they would in this embodiment be part trapezoidal. In other preferred embodiments, these may be part triangular in order to potentially better interaction with certain types of produce.

With this configuration and with the incorporation of titanium in the material composition of the peripheral wall of the drum, a particularly robust and lightweight drum is configured which may be readily transported by a single operative. In a preferred embodiment, the drum may be substantially entirely of titanium or titanium alloy in order to weigh no more than 18 kg and have a surface finish which may be of 0.8 micron. It will be particularly advantageous due to its antibacterial properties as it is inherently biologically inert. It will also have exceptional resistance to a range of acids, alkalines, natural waters and industrial chemicals. The provision of titanium will also provide greater fatigue strength and less thermal conductivity making the system suitable for hotter oil application temperatures. It is also particularly advantageous when it employs a conductive wheel 24 which may be positioned in engagement against the outer surface of the drum. In an alternative embodiment, the wheel may be displaceable into a position which is spaced from the drum in order to either function as removing any electrostatic build-up or positively retaining it for certain electrostatically enhanced food flavouring operations.

Other Matters

The titanium drum may be particularly advantageous for removing and placing in an industrial washer.

The system may be advantageous in certain embodiments to provide an accurate, consistent and reliable flavour dispersion. It may lend itself to gentle a tumbling action to minimise waste and maximise uptake. It may optionally have a secure recipe system, easily adjusted via a simple touch screen control interface. An accurate weighing system may optionally ensure additions are matched to product. In combination, the system may in certain embodiments be particularly advantageous to reduce cleaning time, facilitate rapid changeover of contact parts minimising downtime and maximising production.

The system may also facilitate an increase in the throughput range whilst satisfying rigorous sanitation requirements.

The system may also provide an economically efficient solution, for reliably and accurately adding proportional wet and dry seasonings and flavours dynamically, in a single large capacity removable titanium drum. The systems may also offer a quick single operator flavour changeover taking less than two minutes (excluding cleaning) ensuring minimum downtime and maximum throughput (changing the product feed vibrator, powder screw parts and vibrator, oil lance and tumbler drum). A recipe controlled driver allows complete customisation and repetition of process. The system may meet rigorous sanitation requirements including, seafood's and meats as well as fried, baked and expanded snack foods, fruits, nuts, confectionary and frozen products.

In a preferred embodiment, a full size solid titanium tumbling drum with a 12 kg product capacity and 0.8µ (micron) surface finish that can be removed easily by an individual.

The drum may be held within a stainless steel annulus and can be tipped (along with the wet additions lance system) in 0.1° increments to a pre-set recipe, to increase or decrease residence time and improve product coating and consistency. For calibration, drum removal and cleaning the drum assembly can be rotated by up to 120°.

The system may provide a system for closed loop wet additions of eg. oil, glaze, slurries, other seasoning adhesives as well as liquid flavour additions fed from either a factory ring main or tank system. An inline heating and circulation system may additionally be provided for heating and holding hard fats such as palm oil and butters at temperatures up to 60° (without pipe upgrade) during and between production runs. Programmable heat and pressure is constantly monitored to ensure reliable and repeatable application dispensed through an array of electronically controlled nozzles arranged to give a superior coating area with a finer spray that does not use compressed air. The wet additions system is simply dismountable and can be easily and quickly broken into parts for deep cleaning, the system may also have CIP connectivity.

Within the second third of the tumbling drum dry additions can be applied, leaving the final third for tumbling only. Powder additions are fed via a Polar Systems quick change feed screw, which allows an operator to change over all product contact parts in less than 45 seconds. The loss in weight system constantly monitors and checks its loss to an accuracy of two grams, independent agitators and screw motors allow for programmable agitation cycles which can reliably control the density and flow of even the most difficult powders. A quick change hopper may have a larger capacity than most prior art systems and the lowest fill height of any prior art system. Manually filled systems are available with an automatic lid extraction system, automated powder fill systems with remote infeed hoppers are available and can further reduce air borne seasoning within the packing hall. Additional on machine extraction options are also available if required. Additions dispensed from a screw onto a removable, covered, scalf vibrator, with a specially designed discharge which increases the distribution area reducing the concentration and providing superior dispersion onto product.

Dynamic gentle handling vibratory (with approximately 0.05µ (micron) contact surface finish) weighs product continuously, within a one gram accuracy. The drum infeed pan is a quick release system and benefits from an off-centre feed developed to control product flow in line with drum rotation and reduce wastage.

The system is centrally controlled from an easily usable touch screen located on the machine or remotely. The system continually calculates, modifies, and checks levels of wet and dry additions, matching them to the weighed product in the tumbler drum in line with parameters pre-set in the products recipe list which is easily transferable between machines. All ingredient, machine set up requirements and all aspects of adjustable functionality including speeds, ratios, timings, pre-set angles, pressures and temperatures are set in the secure recipe system, which restricts available information based on operator and supervisor access levels, thus protecting functionality and sensitive data. The control system is able to receive signals from the line and weighing/bagging system to moderate its throughput and regulate flow and achieve greater operationally efficiencies.

The invention claimed is:

1. A system for processing foodstuff comprising a drum and a conveyor for conveying foodstuff to said drum; the drum having a peripheral wall and at least one opening into which, in use, foodstuff enters said drum; said drum having a proximal extremity and a distal extremity; said drum being rotatable about at least one axis of rotation; whereby foodstuff may be tumbled against the peripheral wall for flavouring and/or seasoning said foodstuff; said peripheral wall comprising longitudinally disposed fold lines forming longitudinally extending facets; and said drum being removable; wherein said peripheral wall comprises titanium or a titanium alloy.

2. The system according to claim 1, wherein said peripheral wall forms part triangular repeating patterns when the peripheral wall is viewed in cross-section.

3. The system according to claim 1, wherein said drum is mounted at its proximal extremity on a mount which substantially surrounds the perimeter of the drum; said mount having a fastener which is releasable to allow the removal of said drum.

4. The system according to claim 1, wherein said mount houses a belt arranged to drive the rotation of said drum about a longitudinal central axis of said drum.

5. The system according to claim 4, wherein said drum incorporates a ring disposed at its proximal extremity and said belt releasably engages said proximal ring to convey rotation.

6. The system according to claim 1, wherein said drum is mounted to allow it to pivot; whereby its distal extremity is displaceable in one or a combination of the X and Y directions.

7. The system according to claim 1, wherein said distal extremity of said drum comprises a ring.

8. The system according to claim 1, wherein said peripheral wall has a thickness of less than 1.75 mm.

9. The system according to claim 1, wherein said peripheral wall has a thickness of 1.25 to 1.75 mm.

10. The system according to claim 1, wherein said peripheral wall has a thickness of about 1.5 mm.

11. The system according to claim 1, wherein said peripheral wall has a surface finish of 0.5 to 1 micron.

12. The system according to claim 11, wherein said peripheral wall has a surface finish of 0.8 micron.

13. The system according to claim 1, further comprising a mixing stage incorporating at least one nozzle for introducing liquid into said drum; whereby liquid is applied to foodstuff.

14. The system according to claim 1, further comprising a mixing stage incorporating a feeder for introducing further foodstuff.

15. The system according to claim 1, wherein said system further comprises an electrostatic charger for polarising foodstuff.

16. The system according to claim 1, wherein said peripheral wall forms part trapezoidal repeating patterns when the peripheral wall is viewed in cross-section.

17. The system according to claim 1, wherein the drum is substantially entirely of titanium or a titanium alloy.

18. The system according to claim 1, further comprising a conductive wheel positioned against said drum, said conductive wheel conducting away charge from said drum during operation.

19. The system according to claim 1, further comprising a conductor movable between a first position wherein said conductor is in engagement against said drum and a second position wherein said conductor is spaced apart from said drum, said conductor conducing away charge from said drum when in said first position.

* * * * *